(12) United States Patent
Xia (10) Patent No.: US 11,187,950 B2
(45) Date of Patent: Nov. 30, 2021

(54) ARRAY SUBSTRATE AND METHOD OF MANUFACTURING SAME

(71) Applicant: TCL CHINA STAR OPTOELECTRONICS TECHNOLOGY CO., LTD., Guangdong (CN)

(72) Inventor: Hui Xia, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/616,968

(22) PCT Filed: Nov. 12, 2019

(86) PCT No.: PCT/CN2019/117535
§ 371 (c)(1),
(2) Date: Nov. 26, 2019

(87) PCT Pub. No.: WO2021/056732
PCT Pub. Date: Apr. 1, 2021

(65) Prior Publication Data
US 2021/0088859 A1  Mar. 25, 2021

(30) Foreign Application Priority Data

Sep. 25, 2019 (CN) .......................... 201910913406.1

(51) Int. Cl.
*G02F 1/1362* (2006.01)
*G09G 3/36* (2006.01)

(52) U.S. Cl.
CPC ..... *G02F 1/136286* (2013.01); *G09G 3/3688* (2013.01)

(58) Field of Classification Search
CPC ................. G02F 1/136286; G02F 2001/13456
See application file for complete search history.

(56) References Cited

U.S. PATENT DOCUMENTS

| 2004/0263706 A1* | 12/2004 | Cho ................... G02F 1/136286 349/43 |
| 2010/0072483 A1 | 3/2010 | Bae et al. |
| 2013/0168707 A1 | 7/2013 | Huang et al. |
| 2013/0286314 A1* | 10/2013 | Yoshida ................ G02F 1/1368 349/43 |
| 2014/0167052 A1 | 6/2014 | Park et al. |

(Continued)

FOREIGN PATENT DOCUMENTS

| CN | 102623397 A | 8/2012 |
| CN | 202421684 U | 9/2012 |

(Continued)

*Primary Examiner* — Jessica M Merlin
(74) *Attorney, Agent, or Firm* — Mark M. Friedman (57) ABSTRACT

An array substrate and a method of manufacturing the same are provided. The array substrate includes a substrate, a gate layer, a first insulating layer, a gate tracking layer, and a second insulating layer. The method of manufacturing the array substrate includes a substrate providing step, a gate layer forming step, a first insulating layer forming step, a gate tracking layer forming step, and a second insulating layer forming step.

10 Claims, 4 Drawing Sheets

(56) References Cited

U.S. PATENT DOCUMENTS

| | | | | |
|---|---|---|---|---|
| 2014/0204302 A1* | 7/2014 | Shen | ............... | G02F 1/136286 |
| | | | | 349/43 |
| 2015/0214246 A1* | 7/2015 | Wu | ............... | H01L 27/124 |
| | | | | 257/347 |
| 2016/0020224 A1* | 1/2016 | Kawamura | ......... | H01L 27/1248 |
| | | | | 345/213 |
| 2016/0351720 A1* | 12/2016 | Yamazaki | ............. | H01L 29/045 |
| 2018/0059491 A1 | 3/2018 | Xu | | |

FOREIGN PATENT DOCUMENTS

| | | |
|---|---|---|
| CN | 105514032 A | 4/2016 |
| CN | 106409796 A | 2/2017 |

\* cited by examiner

ARRAY SUBSTRATE AND METHOD OF MANUFACTURING SAME

FIELD OF INVENTION

The present disclosure relates to the field of display technologies, and more particularly to an array substrate and a method of manufacturing the same.

BACKGROUND OF INVENTION

At present, narrow border screens and even borderless screens have become a mainstream of small-size mobile phones in a current market. In order to increase a screen ratio as much as possible, to achieve a narrow border of mobile phone screens or even no border, it is necessary to reduce left and right edges and upper and lower edges as much as possible.

Gate driver on array (GOA) technology is a row driving technology of an array substrate. An original array process of a liquid crystal display panel is used to fabricate a driving circuit of horizontal scanning lines around a display area on a substrate, so that it can replace an external integrated circuit (IC) to complete driving of the horizontal scan lines. The GOA technology can reduce a bonding process of the external IC and has an opportunity to increase production capacity and reduce product costs.

In the prior art, in order to manufacture narrow border display products or borderless display products, space of a GOA circuit is usually compressed to achieve a narrow border on both sides of a display area. However, this practice adversely affects a performance of the GOA circuit and an overall antistatic ability of a liquid crystal display panel.

In the prior art, a tracking gate line in pixel (TGP) display panel is proposed. The TGP display panel is mainly composed of an array substrate, a color filter substrate, and a liquid crystal layer sandwiched between the array substrate and the color filter substrate. The array substrate can be divided into a display area and a non-display area. A plurality of pixel units arranged in an array are disposed on the display area, and each of the pixel units includes a thin film transistor and a pixel electrode connected to the thin film transistor.

In the prior art, the array substrate sequentially includes a substrate, a gate layer, a first insulating layer, a gate tracking layer, and a second insulating layer. The gate tracking layer is disposed in a non-display area. The method of manufacturing the array substrate includes following steps. The gate layer is formed on the substrate. The first insulating layer is formed on an upper surface of the gate layer. A metal material is deposited on an upper surface of the first insulating layer to form the gate tracking layer. A photoresist solution is coated on a surface of the gate tracking layer to form a photoresist layer. After the photoresist layer is exposed and developed using a mask, a patterned photoresist layer is formed. The substrate is etched, the patterned photoresist layer is etched at a same position as the first insulating layer to form a through hole to achieve exposing the gate layer. The photoresist layer is removed. In a subsequent step, the through hole may be deposited by a conductor layer (such as an ITO layer), such that the conductor layer is connected to the gate layer, such that the gate layer is connected to the gate tracking layer through the conductor layer. In the prior art, manufacturing process of the array substrate is complicated and production cost is high. When the array substrate and other components together form a display panel, because a data line or a gate line on the array substrate are far from an edge of the display panel to a display area, a line width is narrow, resulting in frequent short circuits or open circuits. In addition, a traditional design has a large space at the edge of the panel, and there is a conflict with the display panel that implements a narrow border.

SUMMARY OF INVENTION

An object of the present invention is to provide an array substrate and a method of manufacturing the same, which solves issues of the prior art that a gate driver on array (GOA) circuit space is compressed to realize a narrow border of a display panel, which may cause poor antistatic capability of the display panel, process of manufacturing an array substrate is complicated, and production cost is high.

In order to achieve the above object, an embodiment of the present invention provides an array substrate. The array substrate includes a substrate; a gate layer attached to a surface of a side of the substrate; a first insulating layer attached to the gate layer and the surface of the side of the substrate, wherein the first insulating layer is provided with a through hole; a gate tracking layer attached to a surface of the first insulating layer away from the side of the substrate, filling the through hole, and connected to the gate layer; and a second insulating layer disposed on the gate tracking layer and the surface of the first insulating layer away from the side of the substrate.

In an embodiment of the present invention, the first insulating layer is an inorganic substance, material of the first insulating layer includes cerium oxide and/or aluminum zirconium oxide; the second insulating layer is an organic substance, and material of the second insulating layer includes polymethyl methacrylate.

In an embodiment of the present invention, the array substrate further includes an active layer disposed on a surface of the second insulating layer away from the side of the substrate; at least one source/drain layer disposed on the surface of the second insulating layer away from the side of the substrate; and a data line layer disposed on the surface of the second insulating layer away from the side of the substrate and connected to the source/drain layer. The active layer is located between two adjacent source/drain layers.

In order to achieve the above object, an embodiment of the present invention provides a method of manufacturing the array substrate including following steps: a substrate providing step, providing a substrate; a gate layer forming step, forming a gate layer on an upper surface of the substrate; a first insulating layer forming step, forming a first insulating layer on the gate layer and the upper surface of the substrate, wherein the first insulating layer is provided with a through hole; a gate tracking layer forming step, forming a metal material on an upper surface of the first insulating layer to form a gate tracking layer, filling the through hole, and being connected to the gate layer; and a second insulating layer forming step, forming a second insulating layer on the first insulating layer and an upper surface of the gate tracking layer.

In an embodiment of the present invention, the gate layer forming step includes following steps: a first metal layer forming step, forming a metal material on the upper surface of the substrate to form a first metal layer; a first photoresist layer forming step, coating a photoresist solution on an upper surface of the first metal layer to form a first photoresist layer; a first exposure step, performing an exposure process to the first photoresist layer; a first developing step, developing the first photoresist layer to form a patterned first photoresist layer; a first wet etching step, performing a wet etching process to the substrate to form a patterned gate layer; and a first removing step, removing the first photoresist layer.

In an embodiment of the present invention, the first insulating layer forming step includes following steps: a second photoresist layer forming step, coating a photoresist solution on an upper surface of the gate layer to form a second photoresist layer; a second exposure step, performing an exposure process to the second photoresist layer; a second developing step, developing the second photoresist layer to form a patterned second photoresist layer; a deposition step, depositing an inorganic material on an upper surface of the second photoresist layer to form the first insulating layer; and a second removing step, removing the patterned second photoresist layer and the first insulating layer corresponding to the patterned second photoresist layer to form the through hole. A thickness of the first insulating layer is less than a thickness of the second photoresist layer.

In an embodiment of the present invention, the gate tracking layer forming step includes following steps: a second metal layer forming step, depositing a metal material on the upper surface of the first insulating layer to form a second metal layer; a third photoresist layer forming step, coating a photoresist solution on a surface of the second metal layer to form a third photoresist layer; a third exposure step, performing an exposure process to the third photoresist layer; a third developing step, developing the third photoresist layer to form a patterned third photoresist layer; a second wet etching step, performing a wet etching process to the substrate to form a patterned gate tracking layer; and a third removing step, removing the patterned third photoresist layer.

In an embodiment of the present invention, after the second insulating layer forming step, the method further includes following step: an active layer forming step, forming an active layer on an upper surface of the second insulating layer.

In an embodiment of the present invention, after the second insulating layer forming step, the method further includes following step: at least one source/drain layer forming step, forming at least one source/drain layer on an upper surface of the second insulating layer, the active layer being located between adjacent two source/drain layers.

In an embodiment of the present invention, after the second insulating layer forming step, the method further includes following step: a data line layer forming step, forming a data line layer on an upper surface of the second insulating layer.

The technical effect of the present invention is to provide an array substrate and a method of manufacturing the same. An end of a gate tracking layer is directly connected to a gate layer through a through hole, and another end thereof is connected to an integrated circuit (IC) of a non-display area. The gate tracking layer is disposed in a display area to reduce routing space of the non-display area, so that a display panel realizes a narrow border. In addition, when the gate tracking layer is in contact with the gate layer, a contact resistance between the gate tracking layer and the gate layer can be reduced. Moreover, a manufacturing process of the array substrate is simple.

DESCRIPTION OF DRAWINGS

In order to more clearly illustrate the technical solutions in the embodiments of the present invention, the drawings used in the description of the embodiments will be briefly described below. Obviously, the drawings in the following description are only some embodiments of the present invention. Other drawings can also be obtained from those skilled in the art based on these drawings without paying any creative effort.

Parts in the figures are identified as follows.

| 1 | substrate; | 2 | gate layer; |
|---|---|---|---|
| 3 | first insulating layer; | 4 | gate layer tracking layer; |
| 5 | second insulating layer; | 6 | active layer; |
| 7 | source/drain layer; | 8 | data line layer; |
| 100 | through hole. | | |

DETAILED DESCRIPTION OF PREFERRED EMBODIMENTS

Preferred embodiments of the present invention are described below with reference to the accompanying drawings to illustrate that the present invention can be practiced. These embodiments can fully introduce the technical content of the present invention to those skilled in the art, so that the technical content of the present invention is clearer and easier to understand. However, the present invention can be embodied in many different forms of embodiments. The scope of protection of the present invention is not limited to the embodiments mentioned herein.

The terms "first" and "second" and the like (if any) in the specification and claims of the present invention and the above-mentioned figures are used to distinguish similar objects, and are not necessarily used to describe a particular order or prioritization. It should be understood that the objects so described are interchangeable where appropriate. Moreover, the terms "comprising," "having," and any variants thereof are intended to cover to cover non-exclusive inclusions.

Figure 1:
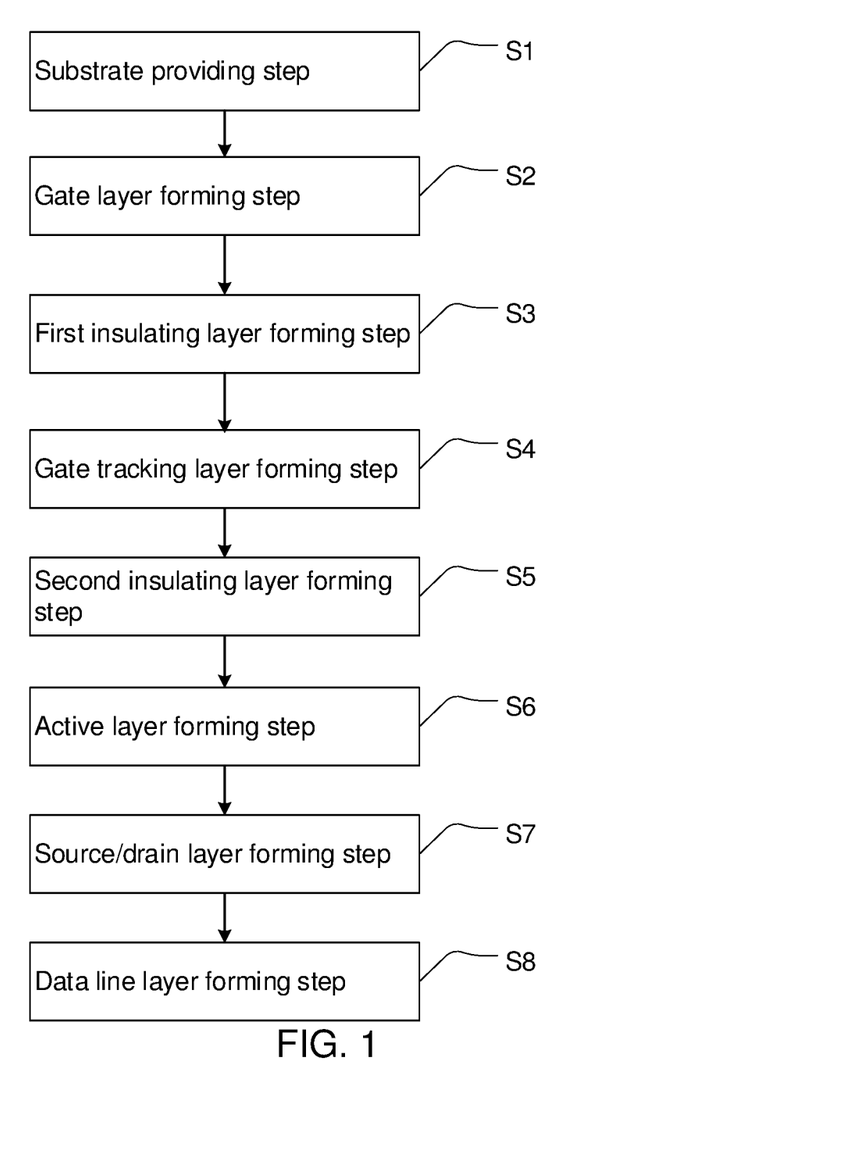
FIG. 1 is a flowchart of a method of manufacturing an array substrate according to an embodiment of the present invention.

As shown in FIG. 1, an embodiment of the present invention provides a method of manufacturing an array substrate, which includes following steps S1 to S8. In the step S1, a substrate providing step, a glass substrate commonly used in the prior art is provided.

Figure 2:
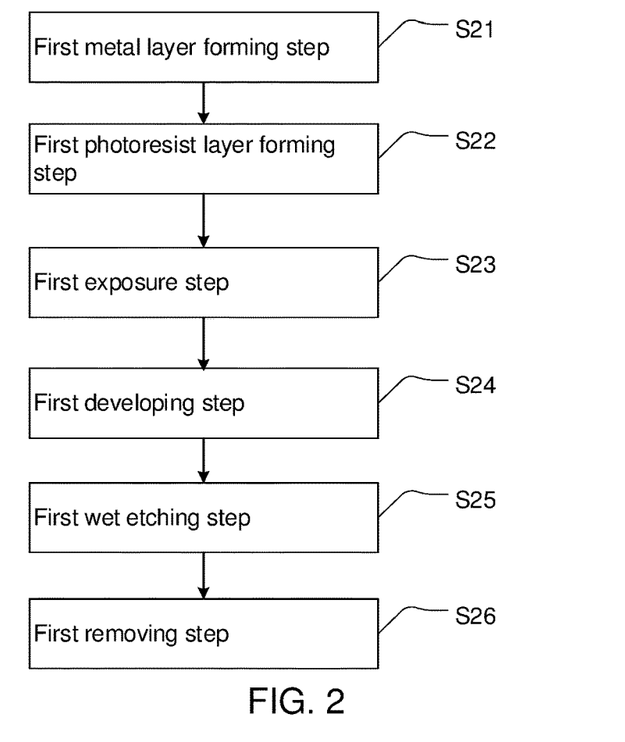
FIG. 2 is a flowchart of a step of forming a gate layer according to an embodiment of the present invention.

In the step S2, gate layer forming step, a gate layer is formed on an upper surface of the substrate, and the gate layer is attached to a portion of the upper surface of the substrate. As shown in FIG. 2, the step S2, a gate layer forming step, includes following steps S21 to S26. In the step S21, a first metal layer forming step, depositing a metal material on a surface of the substrate to form a first metal layer is provided, and the first metal layer may be a molybdenum-copper structure or a molybdenum-aluminum-molybdenum structure, which can avoid gate undercutting occurs during subsequent processing. In the step S22, a first photoresist layer forming step, a user applies a photoresist solution to an upper surface of the first metal layer using a first mask to form a first photoresist layer. In the step S23, a first exposure step, the first photoresist layer is exposed to light under conditions of UV illumination. In the step S24, a first developing step, the first photoresist layer is developed by a developing solution to form a patterned first photoresist layer. In the step S25, a first wet etching step, the substrate is subjected to a wet etching process to form a patterned gate layer. In the step S26, a removing step, the first photoresist layer is removed.

Figure 3:
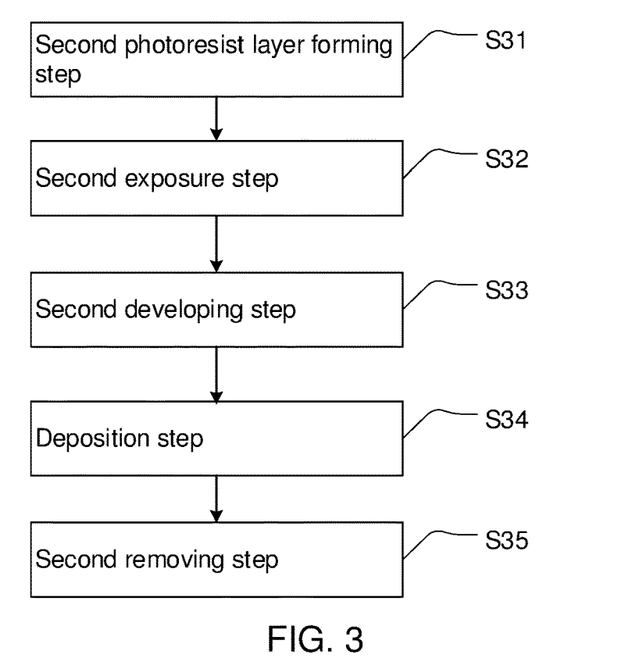
FIG. 3 is a flowchart of a step of forming a first insulating layer according to an embodiment of the present invention.
Figure 4:
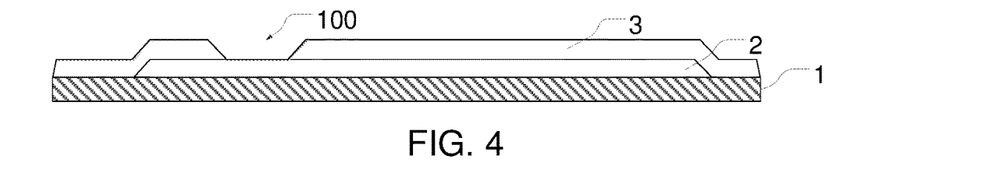
FIG. 4 is a cross-sectional view showing a preparation of a first insulating layer according to an embodiment of the present invention.

As shown in FIG. 3 and FIG. 4, in the step S3, a first insulating layer forming step, a first insulating layer 3 is formed on the gate layer 2 and the upper surface of the substrate 1, and the first insulating layer 3 is provided with a through hole 100. A thickness of the first insulating layer 3 ranges between 0.8 um and 1.2 um. In the step S3, the first insulating layer forming step, includes following steps S31 to S35. In the step S31, a second photoresist layer forming step, using a second mask to coat a surface of the gate layer 2 with a photoresist solution to form a second photoresist layer (not shown). The first insulating layer is an inorganic substance, and material of the first insulating layer includes one or two of cerium oxide and aluminum zirconium oxide. A thickness of the second photoresist layer is greater than 1000 Å. In the step S33, a second developing step, a user develops the second photoresist layer with a developing solution to form a patterned second photoresist layer. In the step S34, a deposition step, an inorganic material is deposited on a surface of the second photoresist layer to form the first insulating layer 3, and a thickness of the first insulating layer 3 is greater than 500 Å. In the step S35, a second removing step, a user removes the patterned second photoresist layer and also removes the first insulating layer 3 at a position corresponding to the patterned second photoresist layer, thereby forming the through hole 100 at the position corresponding to the patterned second photoresist layer.

In this embodiment, a thickness of the first insulating layer is less than a thickness of the second photoresist layer. Preferably, the thickness of the second photoresist layer is more than three times the thickness of the first insulating layer to ensure that during deposition of the first insulating layer on the second photoresist layer, a phenomenon in which a position at which the first insulating layer contacts the patterned second photoresist layer is broken, and the first insulating layer is not required to be etched, so that the first insulating layer is provided with a through hole. In the prior art, the first insulating layer is generally etched by a dry etching method, so that the first insulating layer is provided with a through hole. In the dry etching process, plasma easily damages a surface of the gate layer on a lower surface of the first insulating layer, such that when metal at the formed through hole is brought into contact with the gate layer, a contact resistance is likely to increase.

Figure 5:
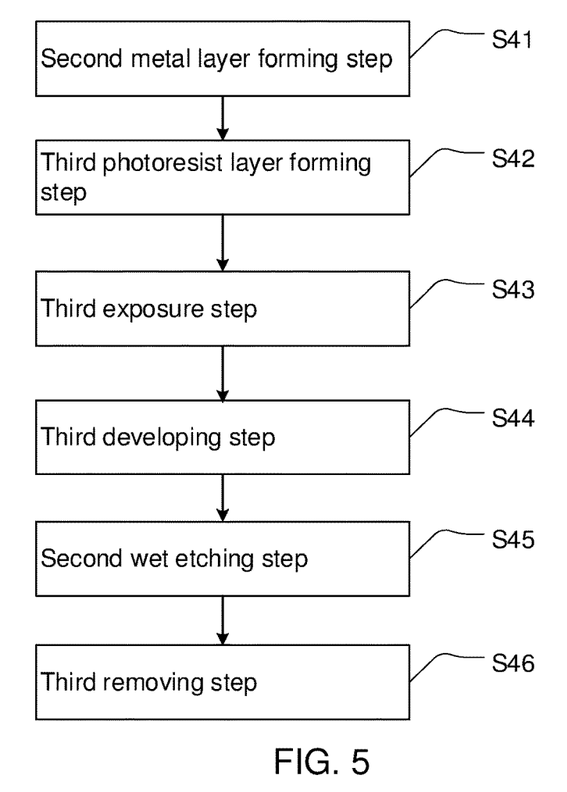
FIG. 5 is a flowchart of a step of forming a gate tracking layer according to an embodiment of the present invention.
Figure 6:
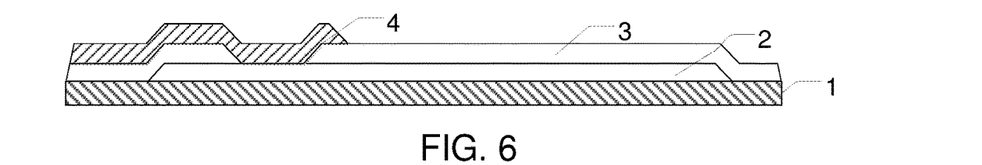
FIG. 6 is a cross-sectional view showing a preparation of a gate tracking layer according to an embodiment of the present invention.

As shown in FIG. 5 and FIG. 6, the step S4, a gate tracking layer forming step, is performed by depositing a metal material on an upper surface of the first insulating layer to form a gate tracking layer 4, filling the through hole, and being connected to the gate layer 2. The Step S4, the gate tracking layer forming step, includes following steps S41 to S46. The step S41, a second metal layer forming step, is performed by depositing a metal material on an upper surface of the first insulating layer to form a second metal layer (not shown). In the step S42, a third photoresist layer forming step, a photoresist solution is coated on a surface of the second metal layer by using a third mask to form a third photoresist layer. In the step S43, a third exposure step, is performed to expose a third photoresist layer. In the step S44, a third developing step, a user develops the third photoresist layer with a developing solution to form a patterned third photoresist layer. In the step S45, a second wet etching step, is performed by wet etching the substrate to form a patterned gate tracking layer 4. In the step S46, a third removing step, is performed by removing the patterned third photoresist layer. The gate tracking layer 4 is overlaid on the upper surface of the first insulating layer 3, fills the through hole, and is connected to the gate layer 2. The gate tracking layer 4 is in contact with the gate layer 2, and a contact resistance between the gate tracking layer 4 and the gate layer 2 can be reduced. Compared with the prior art, the gate tracking layer is disposed in a display area, an end of which is directly connected to the gate layer, and another end of which is connected to an IC circuit of a non-display area, which can reduce trace space of the non-display area, so that the display panel achieves a narrow border.

Figure 7:
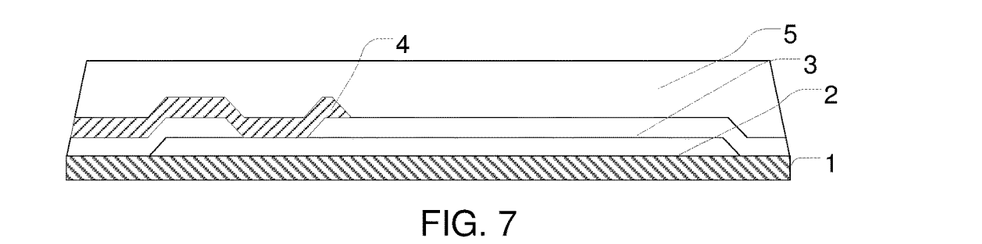
FIG. 7 is a cross-sectional view showing a preparation of a second insulating layer according to an embodiment of the present invention.

As shown in FIG. 7, the step S5, a second insulating layer forming step, is performed by forming a second insulating layer 5 on the first insulating layer 3 and an upper surface of the gate tracking layer 4. The second insulating layer 5 is an organic substance, and the material thereof includes polymethyl methacrylate, which is elastic and has a good sealing function. A thickness of the second insulating layer 5 ranges between 5 um and 7 um.

Figure 8:
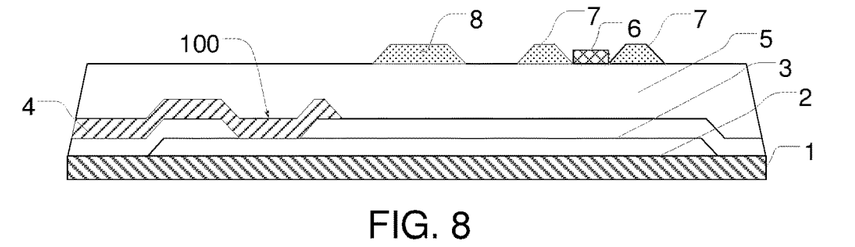
FIG. 8 is a cross-sectional view of an array substrate according to an embodiment of the present invention.

As shown in FIG. 8, in the step S6, an active layer forming step, an active layer 6 is formed on an upper surface of the second insulating layer 5. The active layer is an organic semiconductor pentacene having good flexibility.

In the step S7, at least one source/drain layer forming step, referring to FIG. 8, at least one source/drain layer 7 is formed on an upper surface of the second insulating layer 5, and an active layer 6 is located between the adjacent two source/drain layers 7. A structure of the at least one source/drain layer 7 may be a molybdenum-copper structure or a molybdenum-aluminum-molybdenum structure, which can avoid undercutting of the at least one source/drain layer during subsequent processing.

In the step S8, a data line layer forming step, referring to FIG. 8, a data line layer 8 is formed on the upper surface of the second insulating layer 5.

The execution sequence of the active layer forming step, the at least one source/drain layer forming step, and the data line layer forming step described above may be changed, and the embodiment is not specifically limited.

The embodiment provides a method of manufacturing an array substrate. A gate tracking layer is disposed between adjacent two insulating layers. The gate tracking layer is disposed in a display area, an end of which is directly connected to the gate layer, and another end of which is connected to an IC circuit of a non-display area. Compared with the prior art, the gate tracking layer is disposed in the display area, which can reduce routing space of the non-display area, so that a display panel realizes a narrow border. In addition, the gate tracking layer contacts the gate layer through a through hole to reduce a contact resistance between the gate tracking layer and the gate layer. The gate layer, the at least one source/drain layer, and the data line layer are formed by an insulating layer. In addition, insulation effect of the gate layer is ensured. A thickness of the first insulating layer in the embodiment is less than a thickness of the second insulating layer, so that the array substrate has characteristics of a flexible narrow border.

The embodiment further provides an array substrate. Referring to FIG. 8, the array substrate includes a substrate 1, a gate layer 2, a first insulating layer 3, a gate tracking layer 4, a second insulating layer 4, an active layer 6, at least one source/drain layer 7, and a data line layer 9.

The gate layer 2 is attached to an upper surface of the substrate 1. A structure of the gate layer 2 is a molybdenum-copper structure or a molybdenum-aluminum-molybdenum structure, which can prevent undercutting phenomenon of the gate layer 2 during subsequent processing.

The first insulating layer 3 is attached to the gate layer 2 and the upper surface of the substrate 1. The first insulating layer 3 is provided with a through hole 100. The first insulating layer 3 is an inorganic substance, and material thereof includes one or two of cerium oxide and aluminum zirconium oxide. A thickness of the first insulating layer 3 ranges between 0.8 um and 1.2 um.

The gate tracking layer 4 is attached to an upper surface of the first insulating layer 3, fills the through hole 100, and is connected to the gate layer 2. An aperture at a bottom of the through hole 100 is less than an aperture at a top of the through hole, a busbar of the through hole and a straight line in a vertical direction are between 40° and 70°, and undercutting phenomenon is prevented when the gate tracking layer 4 is connected to the gate layer 2. The gate tracking layer 4 is arranged in a zigzag arrangement, such as an S-shape, a Z-shape, etc., in order to ensure that the gate tracking layer 4 and the gate layer 2 are firmly connected to prevent the gate tracking layer 4 from being peeled off.

Figure 9:
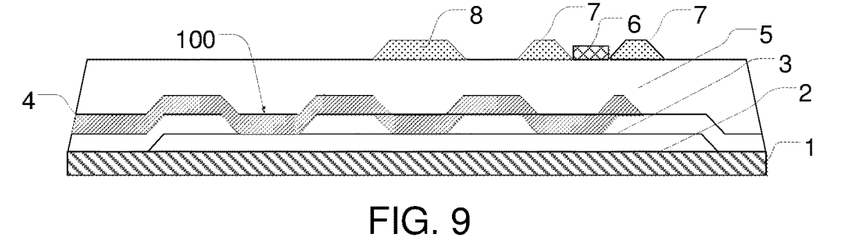
FIG. 9 is a cross-sectional view showing another array substrate according to an embodiment of the present invention.

As shown in FIG. 9, in another embodiment, when the first insulating layer 3 is provided with a plurality of through holes 100, a contact area between the gate tracking layer 4 and the gate layer 2 can be increased, thereby enhancing tightness of connection between the gate tracking layer 4 and the gate layer 2. When the gate tracking layer 4 at a certain through hole 100 is in poor contact with the gate layer 2, electrical connection function can be realized through another through holes 100 without affecting the use.

The second insulating layer 5 is provided on the gate tracking layer 4 and an upper surface of the first insulating layer 3. The second insulating layer 5 is an organic substance, and material thereof includes polymethyl methacrylate. In addition, a thickness of the first insulating layer 3 is less than a thickness of the second insulating layer 5, so that the array substrate has characteristics of a flexible narrow border. A thickness of the second insulating layer 5 ranges between 5 um and 7 um.

The active layer 6, the at least one source/drain layer 7, and the data line layer 8 are all provided on the upper surface of the second insulating layer 5. The at least one source/drain layer 7 may be a molybdenum-copper structure or a molybdenum-aluminum-molybdenum structure, which can avoid undercutting of the at least one source/drain layer during subsequent processing. The data line layer 8 is connected to the at least one source/drain layer, and the active layer 6 is located between adjacent two source/drain layers 7.

Figure 10:
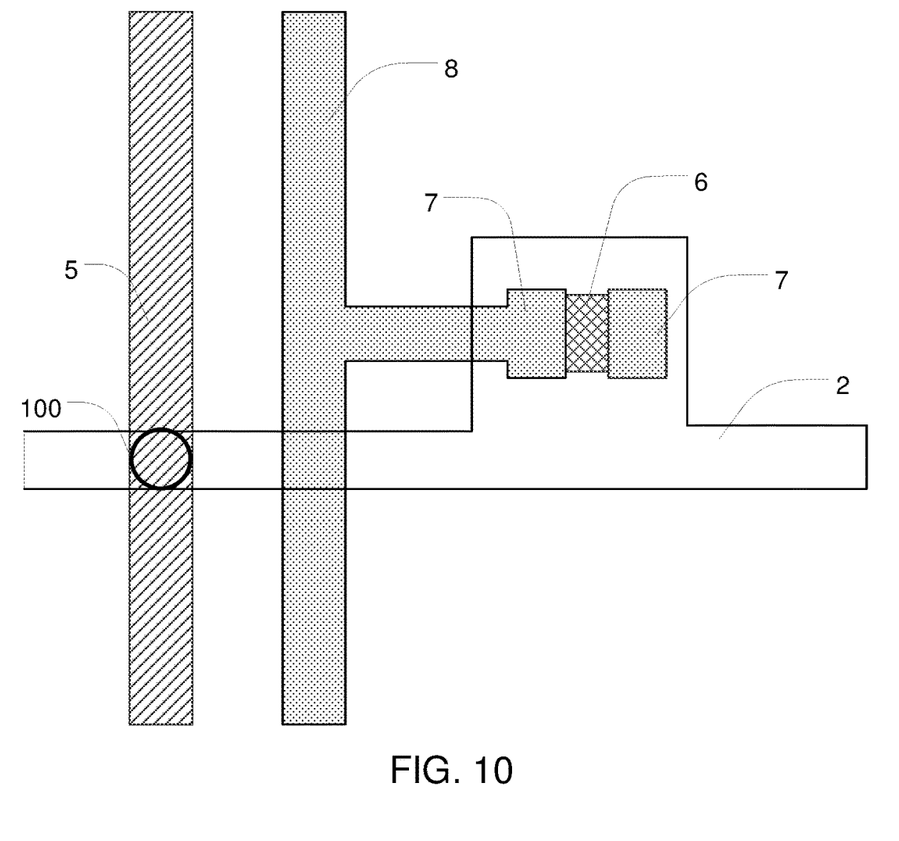
FIG. 10 is a plan view of an array substrate according to an embodiment of the present invention.

As shown in FIG. 10, which is a plan view of an array substrate according to an embodiment of the present invention. It can be seen from FIG. 10 that the gate layer 2 and the gate tracking layer 5 are connected through the through hole 100. Specifically, the gate layer 2 is a gate trace, and the gate tracking layer 5 is a gate tracking line. An end of the gate tracking line is connected to the gate trace through a through hole, and another end of which is connected to an IC circuit of a non-display area. The gate tracking layer is disposed in a display area to reduce trace space of the non-display area, so that a display panel realizes a narrow border, ensures performance of a circuit, and improves quality of the display panel.

In this embodiment, the array substrate may further include other devices or functional layers such as an anode trace, a pixel defining layer, and the like. The improvement of the array substrate of the embodiment of the present invention is that the gate tracking layer is disposed in the display area and is directly connected to the gate layer through a through hole. Therefore, other devices or functional layers such as an anode trace, a pixel defining layer, and the like can be referred to the prior art, and will not be further described herein.

The above is only a preferred embodiment of the present invention. It should be noted that many modifications and refinements can be made by those skilled in the art without departing from the principles of the present invention. These modifications and refinements should also be considered as the protection scope of the present invention.

What is claimed is:

1. An array substrate, comprising:
    a substrate;
    a gate layer attached to a surface of a side of the substrate;
    a first insulating layer attached to the gate layer and the surface of the side of the substrate, wherein the first insulating layer is provided with a plurality of through holes;
    a gate tracking layer attached to a surface of the first insulating layer away from the side of the substrate, filling the plurality of through holes, and connected to the gate layer; and
    a second insulating layer disposed on the gate tracking layer and the surface of the first insulating layer away from the side of the substrate;
    wherein an angle between a busbar of the plurality of through holes and a straight line in a vertical direction which is a direction perpendicular to the substrate is between 40° and 70°, and a configuration of the first insulating layer provided with the plurality of through holes causes a contact area between the gate tracking layer and the gate layer to be increased; and
    wherein a thickness of the first insulating layer ranges between 0.8 um and 1.2 um, and a thickness of the second insulating layer ranges between 5 um and 7 um;
    wherein the gate layer is a molybdenum-copper structure or a molybdenum-aluminum-molybdenum structure, and a configuration of the molybdenum-copper structure or the molybdenum-aluminum-molybdenum prevents undercutting of the gate layer during subsequent processing.

2. The array substrate according to claim 1, wherein the first insulating layer is an inorganic substance, material of the first insulating layer comprises cerium oxide and/or aluminum zirconium oxide;
    the second insulating layer is an organic substance, and material of the second insulating layer comprises polymethyl methacrylate.

3. The array substrate according to claim 1, further comprising:

an active layer disposed on a surface of the second insulating layer away from the side of the substrate;
at least one source/drain layer disposed on the surface of the second insulating layer away from the side of the substrate; and
a data line layer disposed on the surface of the second insulating layer away from the side of the substrate and connected to the source/drain layer;
wherein the active layer is located between two adjacent source/drain layers.

4. A method of manufacturing the array substrate, comprising following steps:
a substrate providing step, providing a substrate;
a gate layer forming step, forming a gate layer on an upper surface of the substrate;
a first insulating layer forming step, forming a first insulating layer on the gate layer and the upper surface of the substrate, wherein the first insulating layer is provided with a plurality of through holes;
a gate tracking layer forming step, forming a metal material on an upper surface of the first insulating layer to form a gate tracking layer, filling the plurality of through holes, and being connected to the gate layer; and
a second insulating layer forming step, forming a second insulating layer on the first insulating layer and an upper surface of the gate tracking layer;
wherein an angle between a busbar of the plurality of through holes and a straight line in a vertical direction which is a direction perpendicular to the substrate is between 40° and 70°, and a configuration of the first insulating layer provided with the plurality of through holes causes a contact area between the gate tracking layer and the gate layer to be increased; and
wherein a thickness of the first insulating layer ranges between 0.8 um and 1.2 um, and a thickness of the second insulating layer ranges between 5 um and 7 um;
wherein the gate layer is a molybdenum-copper structure or a molybdenum-aluminum-molybdenum structure, and a configuration of the molybdenum-copper structure or the molybdenum-aluminum-molybdenum prevents undercutting of the gate layer during subsequent processing.

5. The method of manufacturing the array substrate according to claim 4, wherein the gate layer forming step comprises following steps:
a first metal layer forming step, forming a metal material on the upper surface of the substrate to form a first metal layer;
a first photoresist layer forming step, coating a photoresist solution on an upper surface of the first metal layer to form a first photoresist layer;
a first exposure step, performing an exposure process to the first photoresist layer;
a first developing step, developing the first photoresist layer to form a patterned first photoresist layer;
a first wet etching step, performing a wet etching process to the substrate to form a patterned gate layer; and
a first removing step, removing the first photoresist layer.

6. The method of manufacturing the array substrate according to claim 4, wherein the first insulating layer forming step comprises following steps:
a second photoresist layer forming step, coating a photoresist solution on an upper surface of the gate layer to form a second photoresist layer;
a second exposure step, performing an exposure process to the second photoresist layer;
a second developing step, developing the second photoresist layer to form a patterned second photoresist layer;
a deposition step, depositing an inorganic material on an upper surface of the second photoresist layer to form the first insulating layer; and
a second removing step, removing the patterned second photoresist layer and the first insulating layer corresponding to the patterned second photoresist layer to form the plurality of through holes;
wherein a thickness of the first insulating layer is less than a thickness of the second photoresist layer.

7. The method of manufacturing the array substrate according to claim 4, wherein the gate tracking layer forming step comprises following steps:
a second metal layer forming step, depositing a metal material on the upper surface of the first insulating layer to form a second metal layer;
a third photoresist layer forming step, coating a photoresist solution on a surface of the second metal layer to form a third photoresist layer;
a third exposure step, performing an exposure process to the third photoresist layer;
a third developing step, developing the third photoresist layer to form a patterned third photoresist layer;
a second wet etching step, performing a wet etching process to the substrate to form a patterned gate tracking layer; and
a third removing step, removing the patterned third photoresist layer.

8. The method of manufacturing the array substrate according to claim 4, wherein after the second insulating layer forming step, the method further comprises following step:
an active layer forming step, forming an active layer on an upper surface of the second insulating layer.

9. The method of manufacturing the array substrate according to claim 4, wherein after the second insulating layer forming step, the method further comprises following step:
at least one source/drain layer forming step, forming at least one source/drain layer on an upper surface of the second insulating layer, the active layer being located between adjacent two source/drain layers.

10. The method of manufacturing the array substrate according to claim 4, wherein after the second insulating layer forming step, the method further comprises following step:
a data line layer forming step, forming a data line layer on an upper surface of the second insulating layer.

\* \* \* \* \*